United States Patent [19]

Alden et al.

[11] Patent Number: 4,943,811
[45] Date of Patent: Jul. 24, 1990

[54] DUAL POLARIZATION ELECTROMAGNETIC POWER RECEPTION AND CONVERSION SYSTEM

[75] Inventors: Adrian W. Alden, Masham North; George W. Jull, Nepean; Tom T. Ohno, Carp, all of Canada

[73] Assignee: Canadian Patents and Development Limited, Ottawa, Canada

[21] Appl. No.: 124,159

[22] Filed: Nov. 23, 1987

[51] Int. Cl.$^5$ ............................................. H01Q 21/12
[52] U.S. Cl. .................................... 343/814; 343/810; 343/912
[58] Field of Search ............... 343/795, 798, 801, 810, 343/812, 814, 815, 817, 818

[56] References Cited

U.S. PATENT DOCUMENTS 3,887,925  6/1975  Ranghelli et al. .................. 343/814

Primary Examiner—William L. Sikes
Assistant Examiner—Robert E. Wise
Attorney, Agent, or Firm—Pascal & Associates

[57] ABSTRACT

An antenna array for receiving dual polarized electromagnetic waves, comprised of a first thin-film printed circuit rectenna having a plurality of linear half-wavelength dipole antennae oriented in a first direction for receiving a first component of the dual polarized waves, and a second thin-film printed circuit rectenna parallel to the first rectenna, having a plurality of linear half-wavelength dipole antennae oriented in a second direction for receiving the second orthogonal component of the electromagnetic waves. A reflector screen is disposed parallel and behind the second rectenna, for reflecting incident electromagnetic waves transmitted through the first and second rectennae back to the first and second rectennae for reception thereby. The dipole antenna of the first rectenna are disposed in a predetermined pattern in relation to the second rectenna dipole antennae, the first and second rectennae are separated by one of either substantially zero distance or by a multiple half-wavelength distance, and the second rectenna and reflector screen are separated by a predetermined distance to effect substantial cancellation of transmission line shielding effects and mutual coupling, resulting in high efficiency signal reception.

11 Claims, 4 Drawing Sheets

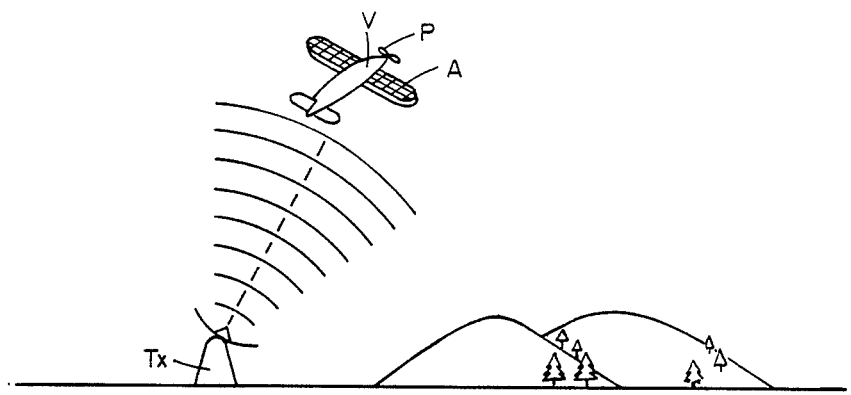
FIG. IA
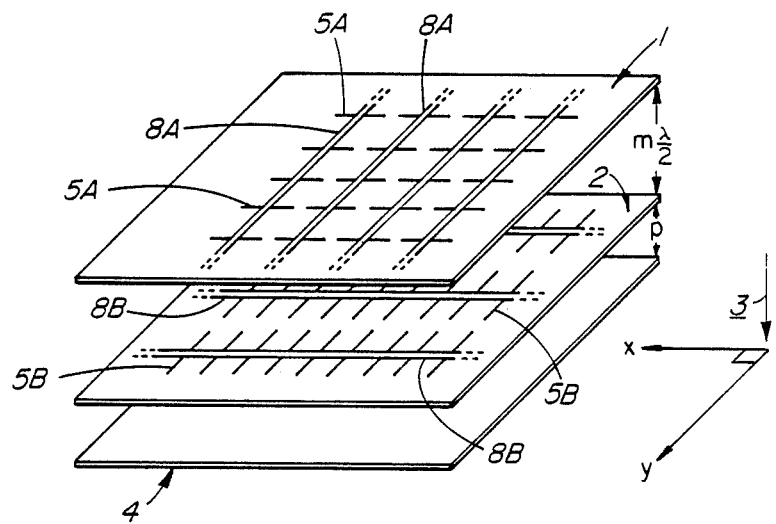
FIG. IB

DUAL POLARIZATION ELECTROMAGNETIC POWER RECEPTION AND CONVERSION SYSTEM

BACKGROUND OF THE INVENTION

This invention relates in general to the transfer of electrical power between two separated locations by means of transmitting and receiving electromagnetic waves, and more particularly to an antenna array for receiving dual polarized electromagnetic waves with high efficiency over a wide range of angles of incidence.

Research in the area of remotely powered mobile systems has centered around the requirement for cost effective means to receive and convert transmitted electromagnetic power into direct current power when the transmitter and receiver are moving relative to one another.

For example, it has been proposed that an electromagnetic power reception and conversion system could be implemented for transmitting propulsive and communications payload power in the 2.4–2.5 GHz microwave ISM band to a lightweight electrically-powered aircraft circling over a fixed ground antenna system for continuous periods of weeks or even months at a time.

One prior art electromagnetic power reception and conversion system is described in U.S. Pat. No. 3,434,678, and is referred to as a linear rectenna. This device consists of an array of linearly polarized half-wavelength dipole antennae, each followed by a conversion system consisting of wave filters and rectifier circuits.

In order to achieve high efficiency power collection with the linearly polarized rectenna described in the prior art patent, the transmitted electromagnetic field must itself be linearly polarized. In addition, the polarization orientation of this field must be maintained parallel to that of the rectenna dipoles, or vice versa, in response to changes in the orientation of the receiving rectenna relative to the power transmission antenna, or due to Faraday rotation of a polarized beam transmitted through the ionosphere, etc. In other words, expensive and complex polarization tracking equipment must be provided at either the transmitting antenna or the receiving rectenna in order for the system to operate properly with high efficiency power collection.

An improvement in linearly polarized rectennae is described in an article entitled "Design Definition of a Microwave Power Reception and Conversion System for Use on a High Altitude Powered Platform" NASA/CR/156866, by W.C. Brown, published in 1981. According to the Brown article, a linearly polarized rectenna is disclosed in the form of a thin-film printed circuit. This type of linear rectenna has many desirable characteristics which were not possessed by earlier prior art rectennae constructed of discrete components; such as those described in a further article of W.C. Brown entitled "The History Of The Development Of The Rectenna", publication of the S.P.S. Microwave Systems Workshop, Rectenna Session, Lyndon B. Johnson Space Center, Houston, Texas, Jan. 15–18, 1980.

With the exception of the inclusion of rectifier diodes, all components of the improved rectenna were etched on a single thin-film dielectric sheet. Therefore, when compared with earlier discrete component rectennae, the potential fabrication costs for volume production are very low. Furthermore, the structural weight of the thin-film rectenna is very low (eg. typically less than 100 grams-per-square-meter), and the thin-film fabrication is very flexible and can be conformed to curved surfaces such as aircraft wings, etc.

However, the improved rectenna disclosed by W.C. Brown also suffers from the principle disadvantage of well known prior art discrete component rectennae, which is that for high efficiency power reception the polarization orientation of the field should be parallel to that of the rectenna dipoles, resulting in the necessity of expensive and complex polarization tracking equipment.

A further prior art system is described in U.S. Pat. No. 3,681,769 which teaches the use of multiple phased arrays of orthogonal dipoles disposed on separate planes and interconnected via transmission lines for transmission of radio signals in a dual polarized beam.

However, this prior art approach suffers from poor efficiency performance due to shielding effects caused by the transmission lines. As an example, when two thin-film rectennae of the type and dimensions described in the latter mentioned article by Brown are laid out in two orthogonal foreplanes as taught by U.S. Pat. No. 3,681,769, it can be readily shown that approximately 30-40% of the power in one polarization is prevented from being received by the transmission lines of the other foreplane. Furthermore, such phased arrays of orthogonally disposed dipoles are subject to extremely poor directivity when applied to systems in which the angle of beam incidence varies (e.g. in systems characterized by relative movement between the transmitting and receiving stations, such as in an electrically propelled airborne transportation system). This is because the directivity of such arrays is proportional to the ratio of the wavelength to the dimensions of the array.

In addition, as the separation between the planes is reduced to electrically small values, as would often be necessary for conformal applications, mutual coupling between the dipoles and transmission lines is known to occur, thereby reducing the reception and conversion efficiencies even further.

One approach to eliminating the prior art requirement for polarization tracking equipment has been to replace the linearly polarized dipole array rectenna with a circularly polarized microstrip antenna array, as described in U.S. Pat. No. 4,079,268. However, it is believed that such a proposed microstrip antenna array would be incapable of achieving the 85% or better reception efficiencies which are characteristic of linearly polarized thin-film dipole rectennae.

SUMMARY OF THE INVENTION

According to the present invention, a dual polarization system is provided comprised of one or more pairs of orthogonally disposed rectennae and a backplane, wherein each pair of rectennae is aligned according to a specific and predetermined pattern and separated by a predetermined distance, and the respective pairs of rectennae are separated from the backplane by predetermined amounts in order to compensate for the shielding effect of the transmission lines.

More particularly, the transmission lines and dipole antennae of each pair of rectennae are oriented such that lines parallel to and midway between the transmission lines on a first one of the rectenna foreplanes are aligned with lines parallel to and midway between the dipoles on the other rectenna foreplane. Conversely, lines perpendicular to and midway between the dipoles of the other rectenna foreplane are aligned with lines parallel to and overlying the dipoles of the first rectenna.

The system according to the present invention is capable of receiving and converting a high fraction of the total power in an incident dual polarization electromagnetic field irrespective of polarization orientation movement between the transmitter and rectenna receiving system. The system also exhibits reduced signal reception efficiency losses as compared to prior art multiple foreplane systems over a wide range of beam incidence angles. Moreover, the system has twice the power handling capability per unit area of the prior art single linear rectenna array.

BRIEF DESCRIPTION OF THE DRAWINGS

A better understanding of the present invention will be obtained with reference to the detailed description below, in conjunction with the following drawings in which:

FIG. 1A is a perspective view of a microwave powered aircraft embodying the principles of the present invention, FIG. 1B is a perspective view of a dual polarization electromagnetic power reception and conversion system configured in accordance with the present invention, with two foreplanes and one reflector backplane.

DESCRIPTION OF THE PREFERRED EMBODIMENT

Figure 2A:
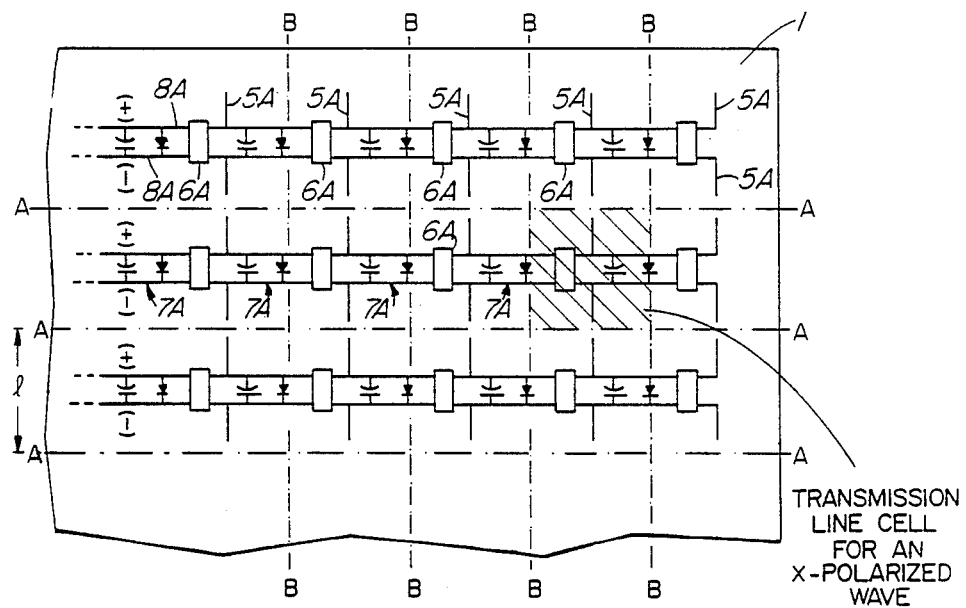
FIG. 2A is a plan view of a first one of the foreplanes illustrated in FIG. 1B, showing the orientation of linear dipoles in the X-direction.

Turning briefly to FIG. 1A, a microwave-powered aircraft V is shown in flight over a microwave transmitter $T_x$. The aircraft has a microwave power receiver and converter A mounted on the aircraft V for receiving microwave energy from the transmitter $T_x$ and converting the received energy to useful power for driving a propeller P (or other propulsion means) as well as supplying payload power for operating onboard equipment. Although FIG. 1A illustrates wing mounted receiver/converters A, additional receivers can be mounted elsewhere on the aircraft for effecting a larger power reception surface.

With reference to FIG. 1B, the dual polarization electromagnetic power receiver and converter of FIG. 1A is shown in accordance with the principles of the present invention in its most general form. X and Y oriented rectenna foreplanes 1 and 2 respectively, are disposed in parallel with one another for intercepting a portion of an electromagnetic beam 3 transmitted perpendicular to the foreplanes 1 and 2.

According to the environment in which the present invention operates, a transmitter antenna ($T_x$ in FIG. 1A) emits dual polarized waves, (i.e. waves of two orthogonal polarizations) which can be unequal in either or both of amplitude and phase. This class of transmitted waves includes the well known cases of linearly and circularly polarized waves. Accordingly, the two orthogonal field components of the incident beam 3 can be resolved into components aligned into each of the two directions, X and Y.

As shown in FIG. 1B, the rectenna foreplane 1 is comprised of an array of linearly-polarized half-wave dipole antenna elements 5A oriented parallel to the X direction. Therefore, the dipole antenna elements 5A are capable of selectively receiving the transmitted wavefield component which is oriented in the X-direction.

The other orthogonal component of the transmitted wavefield, which cannot be received on the dipole elements 5A of foreplane 1, continues to propagate through the foreplane 1 and is incident on foreplane 2. The foreplane 2 is comprised of a second thin-film printed circuit rectenna comprised of a further array of linearly-polarized half-wave dipole elements 5B, oriented parallel to the Y-direction. Therefore, the additional dipole elements 5B can selectively receive the orthogonal component of the transmitted wavefield oriented in the Y-direction.

The dipole elements 5A and 5B are connected via transmission line busses 8A and 8B respectively, as discussed in greater detail below with reference to FIGS. 2A, 2B and 2C. Also, the foreplane 1 is separated from foreplane 2 by a distance of $m\lambda/2$, where m is an integer value (including 0) and $\lambda$ is the wavelength of the received microwave beam 3. Furthermore, foreplane 2 is separated from reflector plane 4 by a predetermined distance "p", as discussed in greater detail below.

Figure 2B:
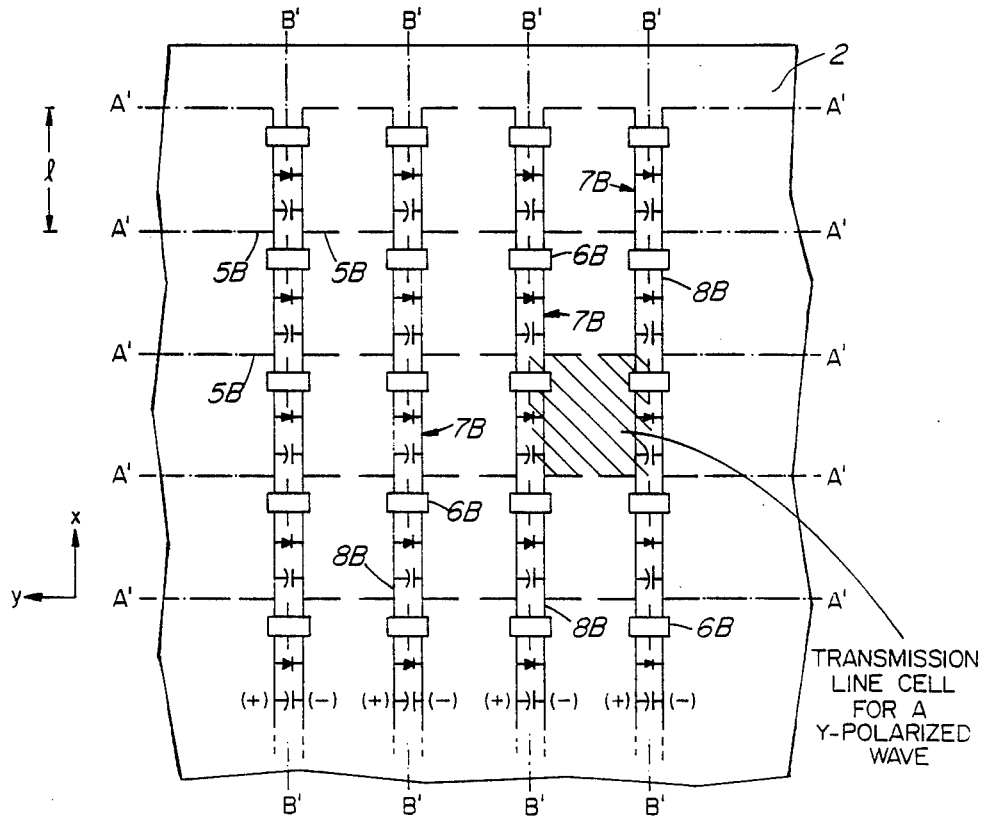
FIG. 2B is a plan view of a second one of the foreplanes illustrated in FIG. 1B, showing the orientation of linear dipoles in the Y-direction.

Turning to FIGS. 2A and 2B, the rectenna foreplanes 1 and 2 are shown positioned relative to one another according to a predetermined pattern, resulting in an increase in the overall dual polarization power reception efficiency over prior art multiple foreplane approaches.

In particular, FIG. 2A illustrates the format and dimensions of the rectenna foreplane 1. Half-wave dipole antenna elements 5A are oriented in the X-direction and are configured in a repetitive spaced array of spacing l, each dipole element 5A being connected to wave filters 6A and rectifier circuits 7A, and to adjacent dipole elements 5A. The transmission lines or busses 8A are disposed orthogonal to the dipole elements, for collecting the converted power from each element of the array.

FIG. 2B illustrates the identical components on the second rectenna foreplane 2. The half-wave dipole antenna elements 5B are oriented in the Y-direction. Thus, the arrangement on rectenna foreplane 2 is the same as that on foreplane 1 except that it is rotated 90° relative to foreplane 1. Furthermore, the lines parallel to and midway between the transmission lines 8B on foreplane 2, (denoted by lines of symmetry B'B' in FIG. 2B), are aligned with the lines parallel to and midway between the dipole elements 5A in foreplane 1 (denoted by lines of symmetry B—B in FIG. 2A). Conversely, the lines perpendicular and midway between respective rows of the dipole elements 5A in foreplane 1 (denoted by lines of symmetry A—A in FIG. 2A) are aligned with the lines parallel to and along the dipole elements 5B of foreplane 2, (denoted by lines of symmetry A'—A' in FIG. 2B).

In order to facilitate a better understanding of the novel characteristics of the present invention, the prior art concept of the "independent transmission line cell" will be explained. For a dual polarized beam, normally incident on the plane of a rectenna array (see FIG. 1), it is well known that the electromagnetic boundary conditions for each component of the two orthogonally polarized waves are not affected by the existence of idealized magnetic and electric walls erected along predetermined planes of symmetry perpendicular to the rectenna foreplanes.

For example, the x-polarized plane wave is characterized by electric walls constructed on planes located at one half the distance between adjacent pairs of transmission lines, (eg. passing through lines A—A and A'A' in FIGS. 2A and 2B, respectively), and magnetic walls constructed on planes located at one half the distance between adjacent parallel dipole elements (e.g. through lines B—B and B'B' in FIGS. 2A and 2B, respectively).

These imaginary electric and magnetic walls extending in front and behind the foreplanes 1 and 2 define identical transmission line cells enclosing each dipole element of the arrays. It has been determined mathematically that when considering the electromagnetic boundary conditions for orthogonally polarized waves, the field outside of the cell may be completely ignored and the array behavior determined from the behavior of a single transmission line cell, such as that represented by the hatched areas of FIGS. 2A and 2B, for the x-polarized component of the received wave. In other words, all mutual coupling due to neighbouring elements is automatically taken into account by the specific configuration of the foreplanes 1 and 2.

From FIG. 2B it is seen that, according to the specific configuration of the present invention, the dipole elements 5B lie along the aforementioned electric walls and therefore do not affect the transmission line characteristics. The rectenna transmission lines 8B also appear as purely inductive strips across the electric walls of the cell.

Similar cells can be constructed for analyzing the characteristics of the Y-polarized wave.

Figure 2C:
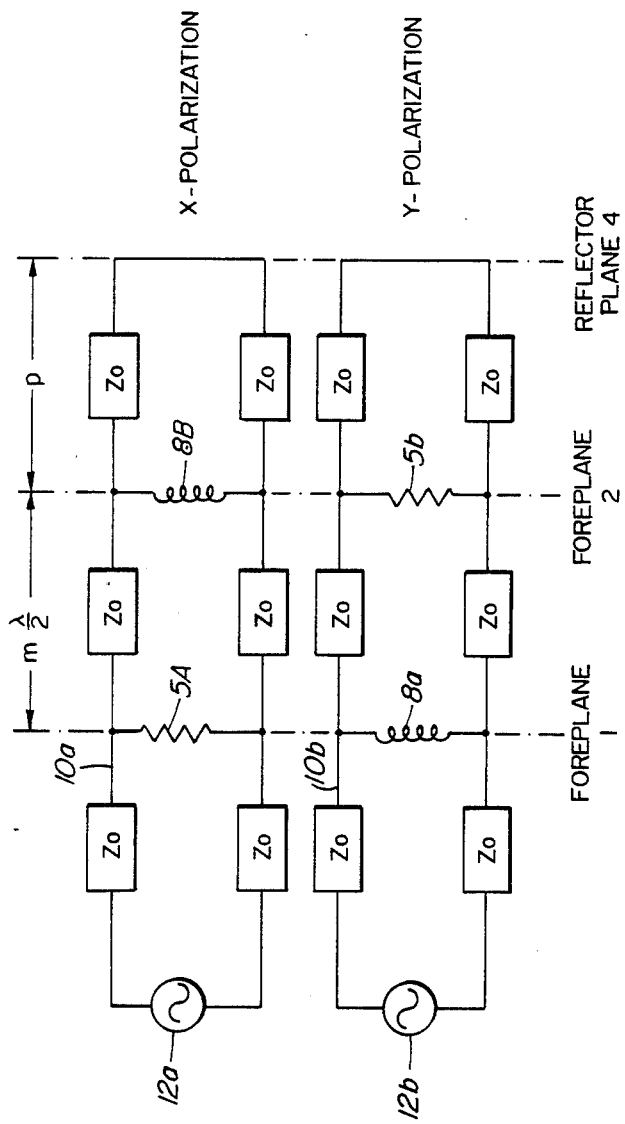
FIG. 2C is a schematic transmission line network model representing the power reception and conversion systems illustrated in FIGS. 1A, 1B, 2A and 2B.

By considering the configuration of foreplanes 1 and 2 according to the above-described concept of the independent cell, a series of foreplanes and reflectors can be equated for analytical purposes with a series of electric network elements connected by free space transmission lines as shown in FIG. 2C, whereby all of the electromagnetic field considerations of the rectenna structure can be translated and reduced to a simple electric network problem.

Specifically, with reference to FIG. 2C, for the X-polarization, a transmission line cell becomes a transmission line $10a$ carrying power from a distant X-polarization microwave transmitter $12a$. This transmission line $10a$ is shunted at foreplane 1 by rectenna dipole elements 5A (terminated with a linear load), shunted at foreplane 2 by the transmission lines 8B which lie across the electric walls, and terminated by reflector plane 4 at a distance "p" from the foreplane 2 (see also FIG. 1B). The characteristic impedance $Z_o$ represents the impedance of the transmission line $10a$ in free space.

Similarly, for the Y-polarization, the transmission line cell becomes a transmission line $10b$ carrying power from a distant Y-polarization microwave transmitter $12b$ and is shunted at foreplane 2 by dipole elements 5B and at foreplane 1 by inductive transmission lines 8A, and terminated by the reflector plane 4 forming a short circuit connection.

It is then a standard network problem to show that when the two foreplanes 1 and 2 are separated by a distance of m $\lambda/2$, where m may take any integer value, the effect of the foreplane transmission lines 8A and 8B may effectively be compensated for. This is accomplished by adjusting the reflector spacing "p" (FIG. 1) to capacitively balance the effect of the inductive strips at the rectenna foreplanes (i.e. the capacitive reactance of the short circuited transmission lines $10a$ and $10b$ at reflector plane 4 is made equal and opposite to the inductive reactance caused by the transmission lines 8A and 8B such that all of the power in the transmission lines 8A and 8B is absorbed by the matched antenna load). It should be noted that "m" may take the value zero (i.e. for conformal applications), provided electrical isolation between the foreplanes 1 and 2 is maintained.

To confirm that the above-described objects of the invention have been met, tests were carried out using circularly-polarized transmitted waves. It was found out that a successful prototype of the embodiment of the present invention resulted in a reception efficiency degraded by less than 5% below that which could be obtained with a single linearly-polarized thin-film rectenna constructed according to prior art. However, according to the present invention, no expensive and complex polarization tracking equipment was required to maintain high efficiency reception in the event of rotational movement between the transmitter and receiver.

Moreover, a successful prototype of the present invention has been incorporated into the world's first microwave powered aircraft which has now completed many test flights under rigorous conditions. All test flights have established the utility of the invention as well as the proven feasibility of remotely powered moving systems.

A person understanding the present invention may conceive of other embodiments or variations therein. For example, whereas the disclosed embodiments relate to rectenna arrays having a square layout, existing prior art rectangular or triangular dipole element layouts may be reconfigured in a square layout embodying the principles of the present invention. Also, the restriction on foreplane separation may be eliminated if separate reflector grids are used for each polarization.

The theory of operation of the present invention described above with reference to FIGS. 1B, 2A and 2B considered only the case of a beam normally incident on an array. However, in accordance with an important feature of the present invention, the method of compensation described above is applicable to any specified angle of incidence, suitable modifications being made to the transmission line cell characteristic impedance and lengths in FIG. 2C.

The specified angle is usually chosen to be that which is most desirable for matching the antenna to its power conversion circuit over the operational range of beam incidence, and it (though not the polarization orientation) can often be strictly controlled, in order to maintain the impedance stability necessary for total energy absorption. Due to the analogy between an off-broadside angle of incidence and an inclined transmission line cell, the effect of the inductive strips may still be compensated for and the transmitted power received by the matched antenna load.

In cases where the range of beam incidence cannot be carefully limited (e.g. banking of the aircraft V relative to the microwave beam in FIG. 1A, or movement of the reception system over long distances,) the variation in rectenna reception efficiency due to varying angles of beam incidence is reduced according to the transmission line compensation scheme of the present invention, with suitable selection of foreplane separation and reflector spacing.

For example, for a dual polarization rectenna of foreplane separation 0.08 λ and a reflector plane 4 located 0.23 λ behind foreplane 2, the efficiency of power reception has been computed to vary from 96% to 80% as the angle of beam incidence varies from 0° to ±50° from broadside. This may be compared to a change in efficiency of from 100% to 67% for prior art rectennae, over the same variation in angle of beam incidence.

Hence, power transmission wavefields can be received according to the present invention over a wide range of incidence angles.

Figure 3:
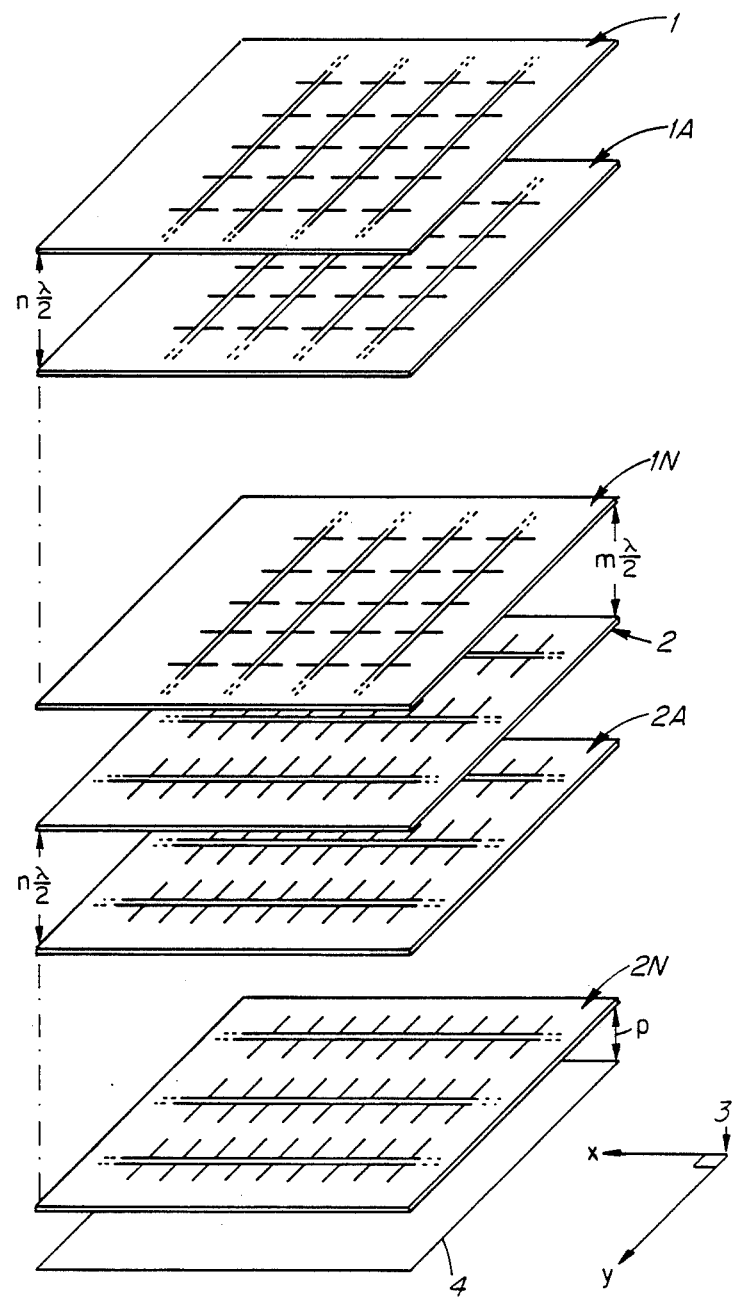
FIG. 3 is a perspective view of an alternative embodiment of the dual polarization electromagnetic power reception and conversion system according to the present invention, with multiple X and Y foreplanes.

Furthermore, once the dual polarization system is formulated in network terms according to the configuration of the present invention, the effect of changes or modifications to the system may be quantified and compensated for according to the aforementioned network model. For example, dielectric material may be inserted above or between the respective foreplanes for mechanical considerations, resulting in changes in the characteristic impedance $Z_o$ above and between the foreplanes. Also in certain applications the required DC power from a rectenna system may be more than can be handled by two foreplanes. Therefore, as shown in FIG. 3, multiple foreplanes (1, 1A...1N, 2, 2A...2N) for each polarization (separated by a multiple of half wavelengths), can be arranged to share the power absorbed in each polarization direction. However, the parallel conversion circuit impedances must be chosen to match the transmission line cell impedance as discussed above.

Moreover, although the successful prototype of the present invention utilized a microwave power transmission, reception and conversion system, it is contemplated that systems could be developed using the principles of the present invention applied to power conversion of electromagnetic energy in other frequency bands (e.g. radio, laser, etc.).

Also, whereas the successful prototype of the invention was implemented on a microwave powered aircraft, it is contemplated that the principles of the present invention may be applied to developing other land, air, sea or space-based transportation systems, or providing payload power to remote equipment, (e.g. high-powered radar, microwave repeater platforms, on-board sensors, etc.).

These and other modifications or variations are believed to be within the sphere and scope of the present invention as defined in the claims appended hereto.

We claim:

1. An antenna aray for receiving a beam of dual polarized electromagnetic waves, comprised of:
    (a) a first rectenna formed from a first plurality of dipole antenna elements connected to a first plurality of transmission lines orthogonal to said antenna elements, for receiving and carrying a first polarization component of said electromagnetic waves, said first plurality of transmission lines being characterized by a predetermined inductive reactance,
    (b) a second rectenna parallel to said first rectenna and formed from a second plurality of dipole antenna elements oriented orthogonally to said first plurality of antenna elements, and connected to a second plurality of transmission lines orthogonal to said second plurality of antenna elements, for receiving and carrying a second polarization component of said electromagnetic waves orthogonal to said first component, said second plurality of transmission lines also being characterized by said predetermined inductive reactance.
    (c) a reflector plane parallel to said second rectenna for reflecting incident electromagnetic waves transmitted through said first and second rectennae back to said first and second rectennae for reception thereby,
    (d) said first and second rectenna being separated by a first predetermined distance given by mλ/2, where m is a whole number and λ is the wavelength of said electromagnetic wave,
    (e) said second rectenna and reflector plane being separated by a second predetermined distance sufficient for causing the capacitive reactance of free space between said second rectenna and said reflector plane to be equal and opposite to said predetermined inductive reactance of said first and second pluralities of transmission lines, and
    (f) said first and second pluralities of dipole antenna elements and transmission lines conforming to a predetermined alignment with respect to each other wherein respective first lines disposed midpoint between respective rows of said transmission lines of the first rectenna are colinear when viewed along said beam with respective dipole antenna elements on said second rectenna, and further lines disposed orthogonal to said first lines and passing midway between successive ones of said dipole antennae of the first rectenna, and further lines disposed orthogonal to said first lines and passing midway between successive ones of said dipole antenna of the first rectenna are parallel to and midway between respective rows of transmission lines of said second rectenna when viewed along said beam, whereby said first and further lines intersect to form a plurality of independent transmission line cells enclosing respective pairs of said dipole antennae of said first rectenna, such that the effect of said predetermined inductive reactance due to said second and first pluralities of transmission lines is compensated for, and the directivity of said array is characterized by the directivity of each of saId cells, thereby resulting in high efficiency reception of said beam of dual polarized electromagnetic waves over a wide range of angles of incidence of said beam on said array.

2. An antenna array as defined in claim 1, wherein each of said first and second thin-film printed circuit rectennae is further comprised of:
    (a) a plurality of wave filters connected to said transmission lines, for filtering said received first and second components of said electromagnetic wave carried by said busses; and
    (b) a plurality of rectifier diodes connected to said transmission lines and said wave filters, for rectifying said received and filtered components carried by said transmission lines, and in response generating an output power signal.

3. An antenna array as defined in claim 1, wherein said first and second rectennae and said reflector plane are separated by predetermined amounts sufficient to capacitively balance any inductance caused by said transmission lines.

4. An antenna array as defined in claim 1, wherein $m=0$, and second rectennae, thereby enabling conformal application of said rectennae to a curved surface.

5. An antenna array for receiving dual polarized electromagnetic waves comprised of:
   (a) a first plurality of parallel oriented thin-film printed circuit rectennae formed from a first plurality of linear half wavelength dipole antennae for receiving a first component of said electromagnetic waves, each of said rectennae of said first plurality being separated by a distance equivalent to a predetermined number of multiples of one half of the wavelength of said electromagnetic waves,
   (b) a second plurality of thin-film printed circuit rectennae oriented in parallel with said first plurality of rectennae and formed from a second plurality of linear half wavelength dipole antennae for receiving a second component of said electromagnetic waves orthogonal to said first component, each of said rectennae of said second plurality being separated by a distance equivalent to said predetermined number of multiples of one half of the wavelength of said electromagnetic waves,
   (c) a reflector screen parallel and adjacent to said second plurality of rectennae, for reflecting incident electromagnetic waves transmitted through said first and second rectennae back to said first and second rectennae for reception thereby, and
   (d) said first and second pluralities of rectennae being comprised of a plurality of DC power collection transmission lines characterized by a predetermined inductive reactance, for interconnecting said first and second pluralities of dipole antennae, said first and second pluralities of rectennae conforming to a predetermined alignment wherein respective first lines disposed mid-point between respective rows of said transmission lines of said first plurality of rectennae are colinear when viewed along said beam with respective dipole antenna elements on said second plurality of rectennae, and further lines disposed orthogonal to said first lines and passing midway between successive ones of said dipole antennae of the first plurality of rectennae are parallel to and midway between respective rows of transmission lines of said second plurality of rectennae when viewed along said beam, whereby said first and further lines intersect to form a plurality of independent transmission line cells enclosing respective pairs of said dipole antennae of said first plurality of rectennae, such that the directivity of said array is characterized by the directivity of each of said cells, and said reflector screen being separated from a closest adjacent one of said second plurality of rectennae by a predetermined distance sufficient for causing the capacitive reactance of free space between said closest adjacent one of the second plurality of rectennae and said reflector plane equal and opposite to said predetermined inductive reactance of said transmission lines, for cancelling mutual inductance between said rectennae, resulting in high efficiency reception of said waves over a wide range of angles of incidence of said waves on said pair of rectennae.

6. An electromagnetic energy transmission, reception and conversion system, comprised of:
   (a) means for generating and transmitting a beam of dual polarized electromagnetic waves,
   (b) a moving vehicle,
   (c) a pair of parallel rectennae and a reflector screen mounted on said vehicle, for receiving and converting said beam of electromagnetic waves to electric power for use on said vehicle,
   (d) said pair of rectennae being separated by a distance of $m\lambda/2$, where m is a whole number and $\lambda$ is the wavelength of said electromagnetic waves, each said pair of rectennae being comprised of a plurality of DC power collection transmission lines characterized by a predetermined inductive reactance, for interconnecting a plurality of dipole antenna elements, and a plurality of wave filters and rectifiers for filtering and rectifying said received beam and in response generating said electric power,
   (e) said pair of rectennae being oriented with respect to each other according to a predetermined alignment of a first plurality of lines parallel to and midway between said transmission lines on a first one of said rectennae with a second plurality of lines parallel to and midway between said dipole antenna elements of the other of said rectennae, and alignment of a third plurality of lines perpendicular to and midway between said dipole antenna elements of said other rectenna with a fourth plurality of lines parallel to and colinear with the dipole antenna elements of said first one of the rectennae, and said reflector screen being parallel to and separated from a closest adjacent one of said rectennae by a predetermined distance sufficient for causing the capacitive reactance of free space between said closest adjacent one of the rectennae and said reflector plane to be equal and opposite to said predetermined inductive reactance of said transmission lines for cancelling mutual inductance between said pair of rectennae, resulting in high efficiency reception of said beam over a wide range of angles of incidence of said beam on said pair of rectennae.

7. An electromagnetic energy transmission, reception and conversion system as defined in claim 6, wherein said means for generating and transmitting said beam of dual polarized electromagnetic waves is comprised of a microwave transmitter.

8. An electromagnetic energy transmission, reception and conversion system as defined in claim 6, wherein said vehicle is an aircraft with said rectennae being mounted on an undersurface thereof, means being provided on said aircraft for receiving said electric power and in response propelling said aircraft.

9. An electromagnetic energy transmission, reception and conversion system as defined in claim 8, wherein said rectennae and said reflector screen are conformally applied to the undersurface of respective wings of said aircraft.

10. An electromagnetic energy transmission, reception and conversion system as defined in claim 6, wherein said plurality of dipole antenna elements and D.C. power collection transmission lines are arranged in a square array.

11. An electromagnetic energy transmission, reception and conversion system as defined in claim 6, wherein said vehicle further includes electrically powered payload, said electric power being applied to operation of said payload.

* * * * *